Oct. 15, 1946.  E. M. BORG  2,409,341
CENTRIFUGAL EXTRACTOR
Filed June 8, 1943  4 Sheets-Sheet 1
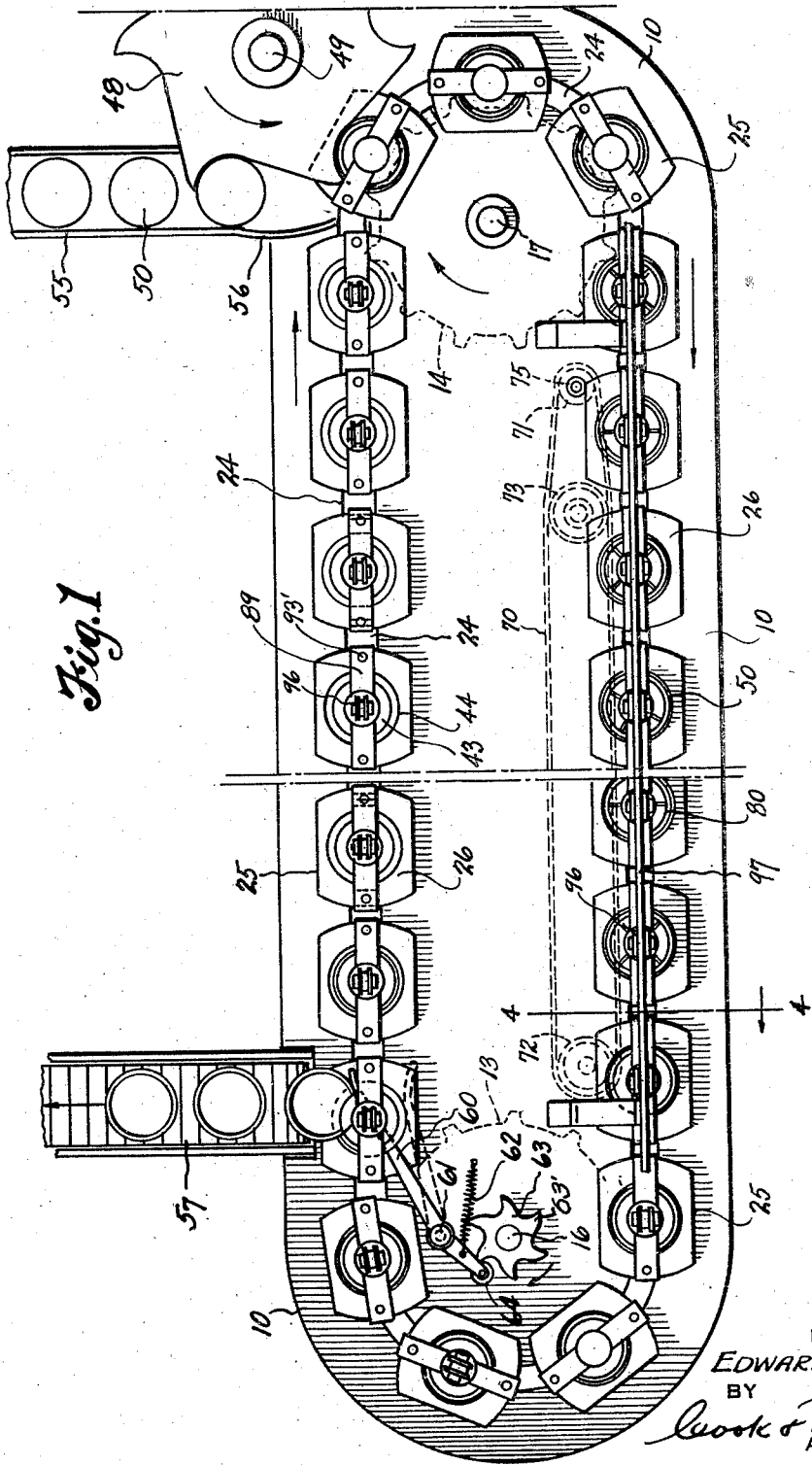
INVENTOR
EDWARD M. BORG
BY
Cook & Robinson
ATTORNEY

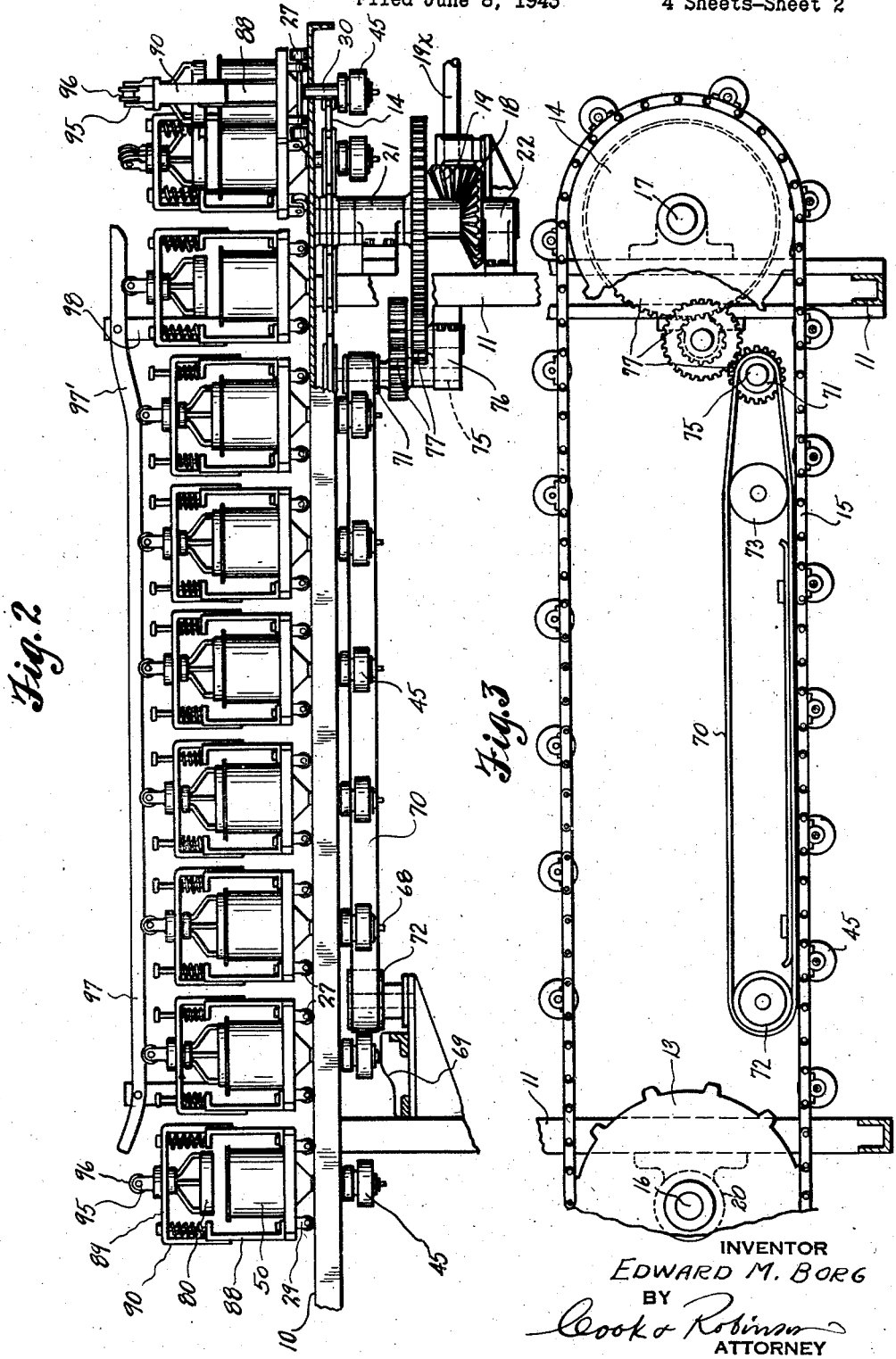

Oct. 15, 1946.  E. M. BORG  2,409,341
CENTRIFUGAL EXTRACTOR
Filed June 8, 1943  4 Sheets-Sheet 3
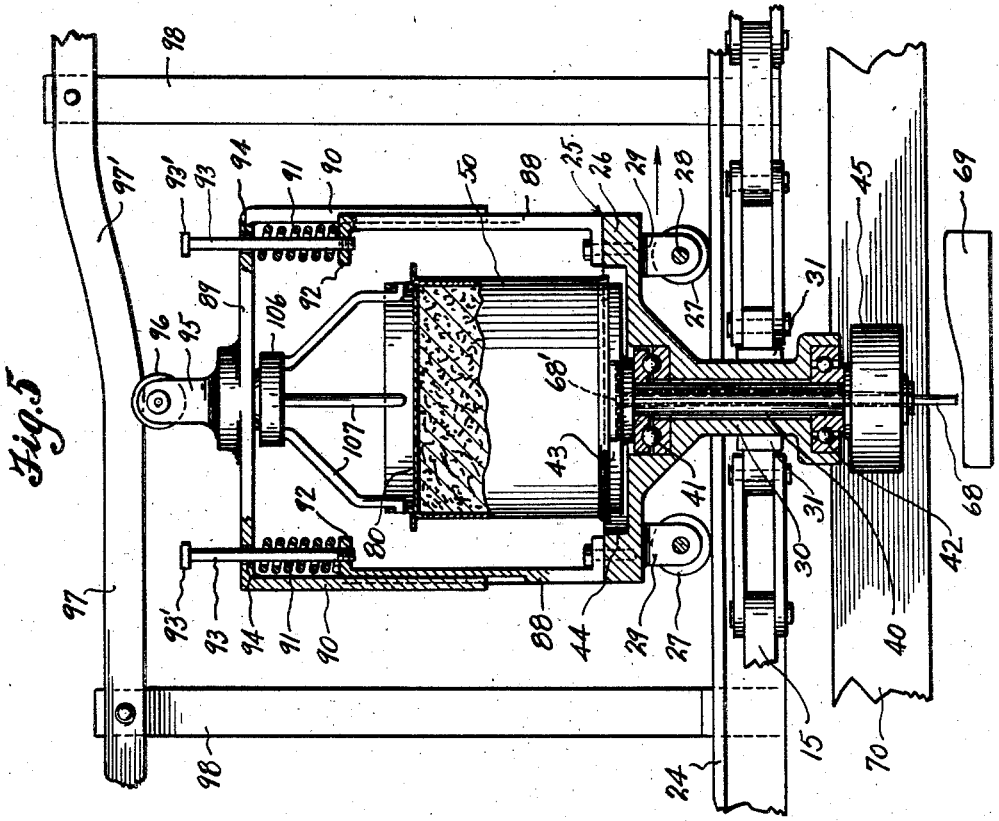
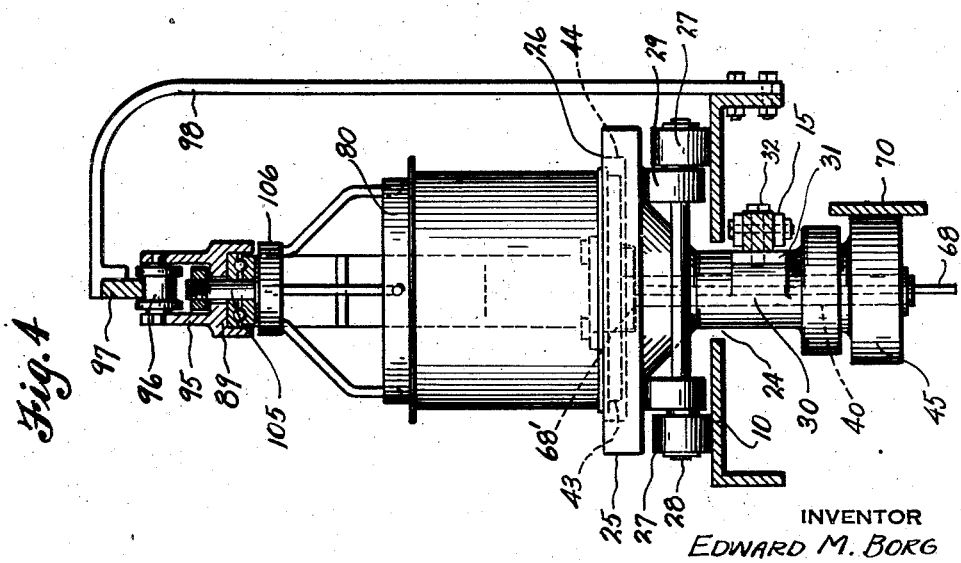
INVENTOR
EDWARD M. BORG
BY
Cook & Robinson
ATTORNEY

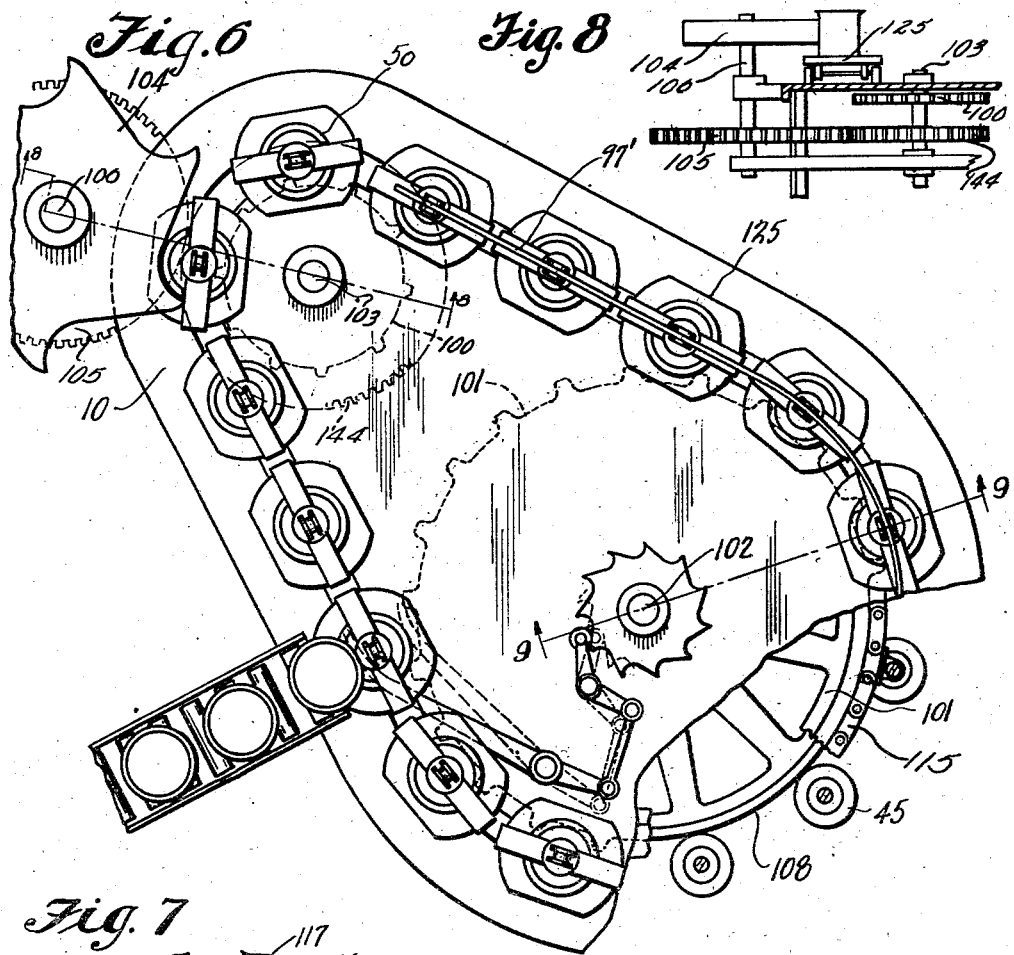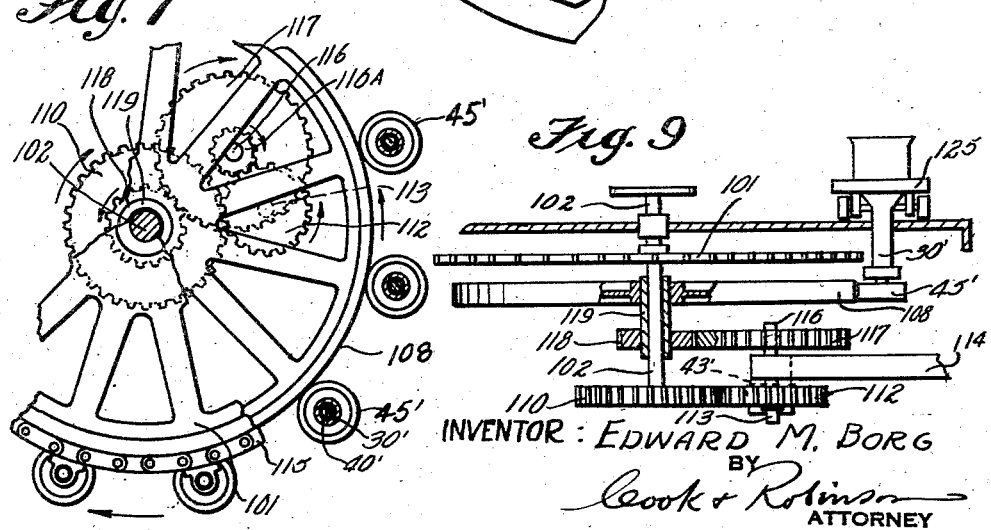

Patented Oct. 15, 1946

2,409,341

UNITED STATES PATENT OFFICE 2,409,341

CENTRIFUGAL EXTRACTOR

Edward M. Borg, Seattle, Wash.

Application June 8, 1943, Serial No. 490,022

10 Claims. (Cl. 226—22)

This invention relates to canning machinery and it has reference more particularly to machines designed for use in the canning of fish in accordance with those methods that have been disclosed in my copending application for patent filed on Feb. 17, 1942, under Serial No. 431,255.

In the canning of some kinds of fish, such as halibut, it is desirable according to those methods disclosed in my pending application, to extract some of the natural liquid content from the meat of the fish after it has been given a certain initial hot water dipping treatment in the cans, whereby to loosen the meat tissues, but before sealing the top end closures on the cans. Furthermore, it is desirable that this extraction of liquid content should be accomplished by some mechanical means that is consistent with the successful and economical practicing of the method. Among the methods which I have previously disclosed and which I now desire to employ for this extraction of liquid from the meat of the fish, is that of centrifugal force, that may be accomplished by spinning the cans of treated fish. Therefore, it has been the principal object of this invention to provide a practical, economical and satisfactory machine for this purpose, comprising mechanism for the conveyance of cans, filled with the treated fish, through the machine and mechanism for causing the spinning of the cans as conveyed whereby to effect a desired extraction of the natural liquid content of the fish meat by that centrifugal force that is incident to the spinning action.

More specifically stated, the objects of this invention reside in the provision of a machine comprising a plurality of individual can supports, connected in succession to a driven belt conveyor; these supports being designed each to receive a filled can thereon as they successively pass a receiving station in the machine, and to convey the cans successively through an interval of travel during which the spinning action for accomplishing the liquid extraction takes place; then to convey the cans in succession to a point of discharge and to mechanism whereby they are displaced from the conveyor and removed from the machine.

It is also an object of this invention to provide means for retaining the meat in the cans during the extraction of liquid by the spinning operation.

Still further objects of the invention are to be found in the details of construction of the various parts of the machine and in their combination and mode of operation, as will hereinafter be fully described.

In accomplishing these and other objects of the invention, I have provided the improved details of construction, the preferred forms of which are illustrated in the accompanying drawings, wherein—

Fig. 1 is a plan or top view of a machine embodying the present invention.

Fig. 2 is a side view of the same.

Fig. 3 is a view showing in plan the conveyor chain belt to which the can carriers are attached, and its relationship to the driven belt whereby the spinning of the can mounting pads is accomplished.

Fig. 4 is an enlarged, cross section taken on the line 4—4 in Fig. 1.

Fig. 5 is a sectional detail of one of the filled cans as located on a can carrier and a cover or retaining disk as applied to the can during the spinning or extraction operation.

Fig. 6 is a plan view of a machine of an alternative form.

Fig. 7 is a fragmental detail of parts of the mechanism shown in Fig. 6.

Fig. 8 is a cross section on line 8—8 in Fig. 6.

Fig. 9 is a cross section on line 9—9 in Fig. 6.

Briefly described, the present machine comprises a conventional type of means operable for the timed delivery into the machine of cans, filled with fish which have been given the initial hot water dipping treatment, mentioned in the patent application above referred to, and other means of conventional type for the removal of the cans from the machine after the liquid extraction operation. In the machine, a continuous, driven conveyor belt is mounted for horizontal travel about driving and supporting sprocket wheels, and attached to this belt at regular intervals of spacing, are the can carriers, each of which is equipped with a vertical spindle, on the upper end of which is a can mounting pad, and on the lower end of which is a driving friction wheel adapted, by reason of the travel of the conveyor belt, to be brought into frictional contact with a driven friction belt, thereby to drive the spindle and rotate the pad to effect the spinning of the can thereon and the centrifugal extraction of liquid from the fish in the can. The can delivery means operates in timing with the travel of the conveyor to deposit the cans successively on the pads and the discharge devices operate to move the cans off the pads and from the machine after the extraction operation; the operation of the machine being continuous.

Referring more in detail to the drawings:

In its present preferred form of construction, Fig. 1, the machine of this invention comprises a flat, horizontal table top 10, here shown as being oval in form, and supported at the desired working height by end frames 11—11 indicated in Fig. 2. Closely beneath the table top, adjacent its opposite ends, are relatively large sprocket wheels 13 and 14, disposed in the same horizontal plane, and about which a continuous conveyor chain belt 15 operates; these sprocket wheels being supported, respectively, by vertical shafts 16 and 17 mounted in the frame as noted in Fig. 3.

The shaft 16 is supported by bearings, such as designated at 20, while shaft 17 is revolubly mounted in bearings 21 and 22; these various bearings being fixed to the end frames 11 and 11 which support the table.

The shaft 17 is equipped with a driving bevel gear wheel 18, as noted in Fig. 2, in operative mesh with a gear 19 fixed on a driven shaft 19x which may extend to any suitable power device.

Formed in the table top, above the line of travel of the conveyor chain belt 15, is a continuous slot 24, and mounted on the table top for travel along this slot are the can carriers 25; all carriers being alike and each comprising a horizontal plate 26 supported by wheels 27 on cross axles 28 extended through lugs 29 that are formed on the under side of the plate at its opposite ends.

Integral with and extending downward centrally from the under side of each carrier plate 26, and passing through the table slot 24, as will be understood best by reference to Figs. 4 and 5, is a tubular bearing 30. The bearing of each carrier is equipped at its lower end with lateral wings 31 which receive bolts 32, or the like whereby the carrier is connected to a link of the conveyor chain belt. Thus, with the travel of the conveyor chain belt, the succession of can carriers, which are attached in close, regular succession to the belt, are caused to travel upon the table top and to follow the fixed path of the slot 24, as will be understood by reference to Fig. 4. Wheel guides may be provided on the table top if such is desired.

Revolubly contained within the tubular bearing 30 of each can carrier is a vertical spindle shaft 40, operatively mounted by sets of antifriction bearings 41 and 42 at upper and lower ends thereof. On the upper end of each spindle shaft is a can mounting pad 43 that is set down within a recess 44 in the plate 26 so as to be flush with the top surface of the latter. Fixed on the lower end of each spindle shaft, which extends somewhat beyond the lower end of the mounting bearing 30, is a friction wheel 45 for revolving the spindle, as will presently be explained.

At one end of the table 10 is a can feeding or delivery device comprising a horizontal star wheel 48 that is fixed on a vertical driving shaft 49. This wheel is rotably driven by shaft 49 in an exact timing with the travel of the can carriers, by reason of their connection with the conveyor chain belt 15, and operates to advance the cans of fish, designated by reference numeral 50, from a supply conveyor 55 onto the carriers 25 as the latter are brought successively into position to receive them, as will be understood by reference to Fig. 1. The star wheel operates to engage and push the individual cans 50 from the conveyor 55 along a guide rail 56 onto the carrier plates 26 and to center them upon the spindle pads 43. These pads are of an exact diameter, and are slightly tapered so as to have an easy and slight wedging fit within the countersink of the end flange of the cans and the cans are thereby held axially centered relative to the spindle shafts and will be caused to rotate with the pads when the shafts are rotated.

Near that end of the table which is opposite that at which the cans are received, and at one side thereof, is a can off-bearing conveyor 57 onto which the cans, after the spinning operation presently to be described, are pushed laterally from their respective carriers as the latter pass this discharge position. This displacing of cans from the carriers is effected by the timed oscillating action of a horizontal lever 60 that is pivotally mounted on the table top by a fixed pivot stud 61. This lever is so located that it may be caused to swing into and from contact with the cans and is actuated for the displacing of a can from its carrier by means of a coiled spring 62 that is fixed under tension thereto. The lever is moved to retracted position after each can displacing action, by a cam wheel 63 that is fixed on the upper end of the shaft 16. This cam wheel has six rises 63' arranged to contact with a cam follower roller 64 on the relatively short inner end of the lever arm. The longer end of the lever swings into and from can ejecting position under the control of the cam which is so designed that as each carrier moves to a position even with the conveyor 57, the lever operates to push the can laterally from the carrier onto the conveyor.

In view of the fact that the lower end flange of each can fits down over the supporting spindle pad, it is necessary that the can be slightly lifted, thus to clear the pad for the lateral sliding of the can from the carriers by the action of the lever arm 60. Therefore, as will be observed by reference to Fig. 5, the spindle shafts 40 are tubular and coaxial of each is a shaft 68 of small diameter which, at its upper end has a small disk 68' fixed thereto to normally lie flush with the top surface of the pad. The lower end of the shaft 68 extends somewhat below the lower end of the spindle shaft and is adapted, when the carrier reaches the discharge position, to engage with a can plate 69 that is fixed in the frame as shown in Figs. 2 and 3, thus to lift the shaft 68 and disk 68' to effect the lifting of the can from its supporting pad, and thus to permit the can to be slid laterally from the carrier platform 26 directly onto the conveyor 57.

Assuming that the cans 50 of treated fish are being successively advanced into the machine by the timed action of the star wheel 48, and are being placed on the carriers 25 and centered upon the spindle pads, it is then the function of the spindles to spin the cans to effect the centrifugal extraction of the liquid content from the fish. To obtain this desired spinning of the cans, I provide a driven friction belt 70, as shown in Figs. 1 and 3. This friction belt extends along a straight run of the conveyor chain belt 15; it is continuous and operates at one end over a belt wheel 71 and at its other end about a driving pulley 72. An idler wheel 73 holds one run of the belt 70 parallel with the line of travel of the adjacent run of the conveyor belt, and in such spaced relationship thereto that as the can carriers are conveyed along this friction belt, the wheels 45 on the lower ends of the spindle shafts will be brought into frictional contact therewith. The belt 70 is driven at a fast rate by means of a shaft 75 which mounts the pulley wheel 71 on its upper end; the shaft 75 being rotatably supported in bearings 76 in the frame structure and is operatively connected with the driven shaft 17 by a gear train designated at 77 in Fig. 3. The travel of the belt 70 causes the wheels 45 and the spindle shafts to spin the cans at a high rate whereby the desired liquid extraction will be effected; it being understood that the liquid will be dissipated from the open upper ends of the cans.

To prevent the fish contents of the cans from spilling out by reason of this spinning action, a retaining closure disk 80 is provided for each can. It is shown in Fig. 5, that each carrier 25 is equipped at its ends with vertical standards 88 and 88 which support a horizontal cross bar 89 centrally and longitudinally over the carrier; the bar 89 having downwardly directed legs 90 and 90 that are slidably mounted on the standards 88 and 88 for limited vertical movement. Coiled springs 91 act, under compression, upwardly, against opposite ends of the cross bar and against inturned feet 92 on the standards, thus to lift the cross bar upwardly; this upward movement being limited by the heads 93' of bolts 93 that are fixed in the feet 92 and extend up through holes 94 in the cross bar.

Mounted centrally upon each cross bar 89 by supports 95 is a roller 96 adapted during travel of the carriers through the machine to be engaged with a cam rail 97 supported from the table top by brackets 98. This rail extends directly over the path of travel of the cans and carriers along the length of the belt 70.

The rail 97 is so positioned that as the carriers 25 successively pass about the first turn in their path of travel and start on the straight line of travel, the rollers 96 will engage therewith. At a location approximately even with the driving pulley 71, the rail 97 is downwardly offset, as at 97' in Fig. 5, thereby to effect the downward movement of the cross car 89 of each carrier as it reaches this location.

Revolubly mounted in the cross bar 89, in a vertical line that is coaxial of the spindle shaft of the carrier pad, is a sipndle 105 which at its lower end mounts a head 106 from which spider legs 107 extend downwardly to rigidly support the closure disk 80; the design of parts being such that when the cross bar 89 is thus moved downwardly by the engaging of the rollers 96 with the downwardly offset part of the cam rail, the disk 80 will be moved just slightly into the open end of the can, as seen in Fig. 5, thus to retain the can contents. This disk may be perforated or slotted for escape of liquid, or it may be of a diameter to provide slight clearance with the can wall. It will be understood that the rollers 45 engage belt 70 immediately after the disk 80 is lowered and that as soon as the rollers 45 disengage the belt and the rollers 96 disengage the cam rail 97, the springs 91 will act to lift the cross bars 89 and thus to lift the closure disks 80 clear of the cans so as not to interfere with their removal from the machine by the action of the ejecting lever arm 60.

By making a machine having a belt 70 of more or less length between the rollers 72 and 73, the spinning period may be extended or shortened accordingly and the rate of spinning can be determined by the speed of travel of belt 70.

A machine of this kind will accomplish the desired extraction of liquid content effectively and quickly and without any damage to the cans or their contents.

In Figs. 6 and 7, I have illustrated an alternative form of machine, wherein a succession of can carriers 125, substantially like the carriers 25 previously described are connected to a sprocket chain belt 115 like belt 15 previously described. Each of the carriers 125 comprises the central depending bearing portion 30' in which a spindle 40' is revolubly contained, as in the device previously described. This spindle carries a can pad 43' and at its lower end has a spindle driving wheel 45'.

This belt 115 is supported horizontally for travel about sprocket wheels 100 and 101; the latter being relatively large and supported for rotation by a vertical shaft 102 which is revoluble in the frame. The sprocket wheel 100 is mounted on a vertical drive shaft 103 and adjacent this sprocket is a star wheel 104 for timing the feeding of cans into the carriers. This is timed by a driving connection with shaft 103, comprising the intermeshing gear wheels 144 and 105 which are fixed respectively on the shafts 103 and a shaft 106 which mounts the star wheel 104, as seen in Fig. 8.

Coaxial of the sprocket wheel 101, and beneath it, is a friction wheel 108 that is revoluble about the shaft 102 and is rotatably driven at high speed by a train of gears shown in Figs. 7 and 9 comprising a gear wheel 110 that is fixed to the lower end of the shaft 102 and drives a smaller idler gear 112 revoluble on a stub shaft 113 that is fixed in a frame member 114. Gear 112 drives a smaller gear wheel 116A fixed on a shaft 116 whereon a larger gear wheel 117 also is fixed. Shaft 116 is revolubly supported in the frame member 114. Gear 117 drives a smaller gear 118 that is fixed on the lower end of a sleeve 119 revoluble on the shaft 102 and which sleeve at its upper end, mounts the friction wheel 108 thereon. In this train of gears, those at opposite ends of the train are fixed respectively to the wheels 101 and 108, while the intermediate gears rotate on stationary axles mounted in the machine frame. The wheels 45' are adapted to be engaged with the rim of wheel 108 to cause the pads to spin the cans carried thereon; as was accomplished by the belt in the device first described.

In this latter device, the same closure supporting structure and closures would be associated with the carriages 125 as shown in Figs. 4 and 5, for retaining the fish in the cans during the spinning operation, and these would be actuated by a cam rail 97' supported from the table top.

Having thus described my invention, what I claim as new therein and desire to secure by Letters Patent is:

1. A machine of the character described comprising a plurality of can carriers, a rotatably mounted pad on each carrier, means for moving the carriers in succession along a continuous path of travel through a receiving station and through a discharge station, a can fed mechanism operable to place an unclosed, product-filled can on each carrier as it moves through the receiving station, means for effecting removal of each can from its carrier as it moves through the discharge station, means for spinning the pads to effect rotation of the cans thereon and an incident centrifugal extraction of liquid content from the solid content of the product in the cans, can cover members supported by the carriers and means for effecting the movement of each from raised position above the can to a position in the can to retain the solid content of the product in the can during the centrifugal extracting while permitting discharge of the liquid content therefrom.

2. A machine of the character described comprising a plurality of can carriers mounted for travel along a continuous path through a receiving station and through a discharge station, a rotatably mounted pad on each carrier, means for causing said carriers to be moved in succession along said path, can fed mechanism timed with the travel of the carriers for centering unclosed, product-filled cans on the pads as the carriers move through the receiving station, means for the removal of cans from the carriers as they move through the discharge station; each of said pads having a mounting spindle, a drive wheel fixed to the spindle, and a friction member in the machine disposed in position to be engaged by said wheel as the carrier travels along the path to cause spinning of the pad and can to effect centrifugal extraction of liquid content from the product and dissipation of the said liquid content from the can and means movable with the can carriers for retaining the solid content of the product in the cans during the periods of liquid extraction.

3. A machine of the character described comprising a plurality of can carriers mounted for travel along a continuous path through a receiving station and through a discharge station, a spindle revolubly mounted in each carrier, a can seating pad on the spindle, means for causing said carriers to be moved in succession along said path, means timed with the travel of the carriers for centering unclosed, product-filled cans on the pads as the carriers move through the receiving station, means for the removal of cans from the carriers as they move through the discharge station; a drive wheel fixed to the spindle of each carrier, a friction member in the machine disposed in position to be engaged by said wheel as the carrier travels along the path to cause spinning of the pads and cans to effect centrifugal extraction of liquid content from the product and dissipation of the said liquid content from the can, a can cover support on each carrier, a can cover movably mounted by the support, yieldable means normally holding the support in a position above the can as placed on the pad, a cam rail on the machine, and means on the cover support adapted to engage the rail to move the cover to position to retain the solid content of the product in the can during the centrifugal extraction and dissipation of the liquid content.

4. A device as in claim 2 wherein the friction member comprises a belt moving in a direction opposite to the direction of travel of the carrier.

5. A device as in claim 2 wherein the friction member comprises a driven, continuous belt with a length thereof extending along the path of travel of the cans between the receiving and discharge stations and supported in position to be engaged by the wheels of the spindles to impart rotation thereto as they move therealong.

6. A device as recited in claim 2 wherein a part of the path of travel of the carriers is circumferentially curved about a center point, and wherein the friction member comprises a rotatably driven wheel that is mounted concentric of that part of the path and is engaged by the spindle drive wheels.

7. In a machine for centrifugal extraction of liquid content from a product, a can conveyor, means for moving the conveyor along a path of travel, an endless belt having a part thereof operating parallel with said path and in a direction opposite the travel of the carrier, a spindle in the carrier, a can mounting pad on the spindle, means for holding an open product-filled can on the pad and for pressing against its solid content during an extracting operation, a drive wheel on the spindle adapted to engage the belt to rotate the spindle and can for centrifugal extraction of liquid content from the product.

8. A centrifugal extractor comprising a carrier member, a support rotatably mounted by the carrier member, means for coaxially centering an unclosed, product-filled can on the support for spinning thereby, a cover member on the carrier member applicable to the can to retain the solid content of the product during spinning of the can, while permitting exit of the liquid content, and means for spinning the support and can to effect the centrifugal extraction and separation of liquid content from the solid content of the contained product and its dissipation from the open end of the can.

9. A centrifugal extractor comprising a carrier member, a support rotatably mounted by the carrier member, means for coaxially centering an unclosed, product-filled can on the support for spinning thereby, a cover member on the carrier member applicable to the open end of the can to retain the solid content of its product during the spinning operation while permitting outflow of the liquid content past the cover member, means for spinning the support and can to effect the centrifugal extraction and dissipation of liquid content from the product, and means for causing the cover member to apply pressure to the product during the process of extraction.

10. A centrifugal extractor comprising a can carrier, a rotatably mounted pad on the carrier, means for moving the carrier along the path of travel between a receiving station and a discharge station, a feed mechanism at the receiving station for centering an unclosed, product-filled can on the pad for spinning thereby, a cover member movable with the carrier, and applicable to the open end of the can with clearance, means for actuating the cover member to a position against the product in the can to retain the solid content in the can during the spinning operation while allowing discharge of liquid conptent past the cover, and means for spinning the pad and can for the centrifugal extraction of liquid content from the product, and its discharge from the open end of the can.

EDWARD M. BORG.